April 16, 1963     T. H. HINCHCLIFFE     3,085,676
CONVEYOR BELT CLEATS
Filed March 18, 1960                                        2 Sheets-Sheet 1
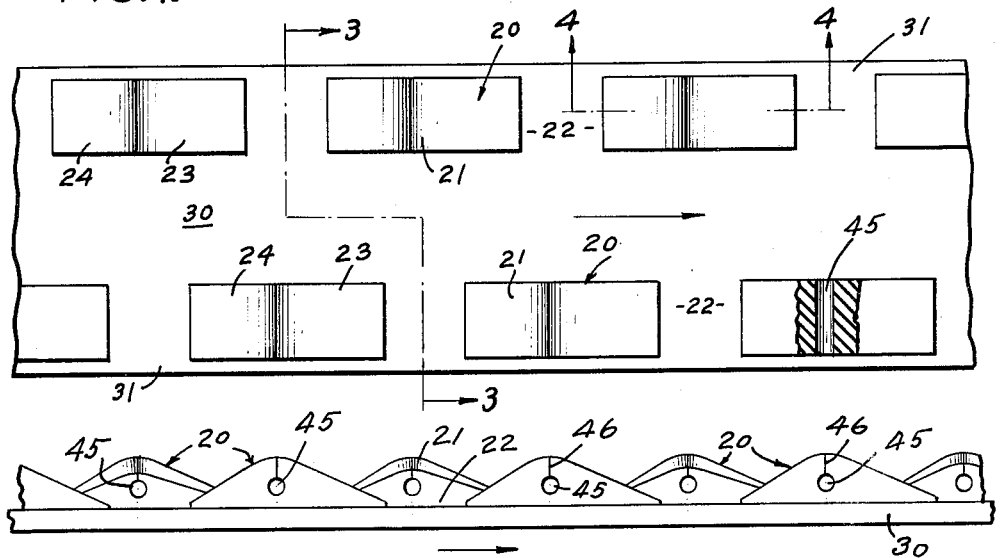
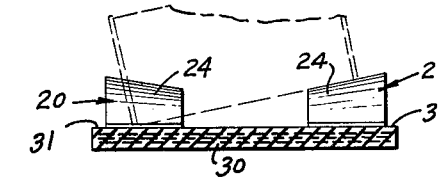
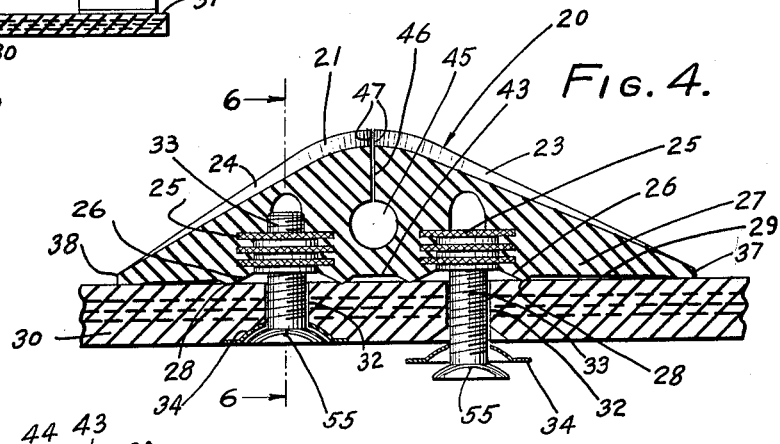
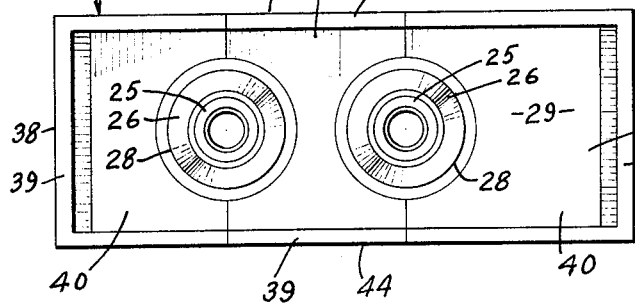
INVENTOR.
THEODORE H. HINCHCLIFFE
BY W. Glenn Jones
ATTORNEY April 16, 1963 T. H. HINCHCLIFFE 3,085,676
CONVEYOR BELT CLEATS
Filed March 18, 1960 2 Sheets-Sheet 2
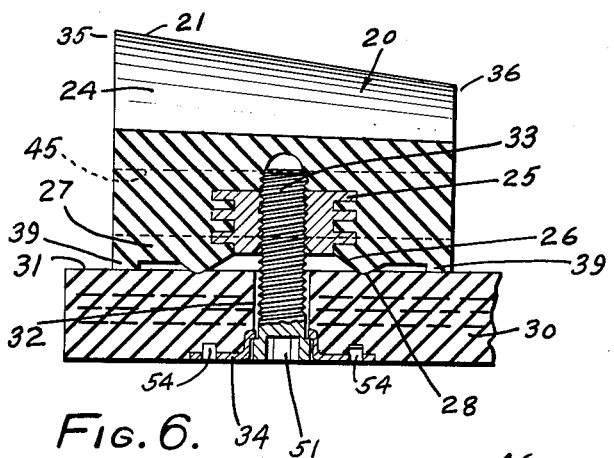
FIG. 6.
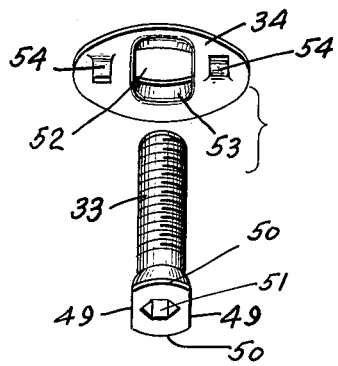
FIG. 7.
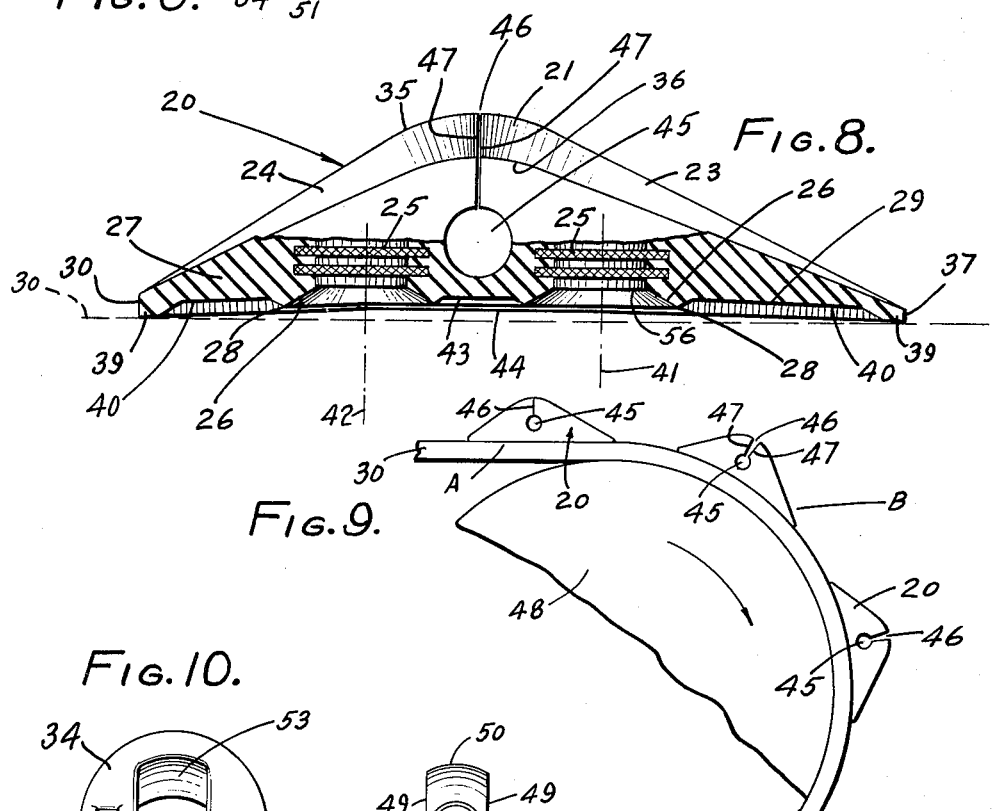
FIG. 8.
FIG. 9.
FIG. 10.
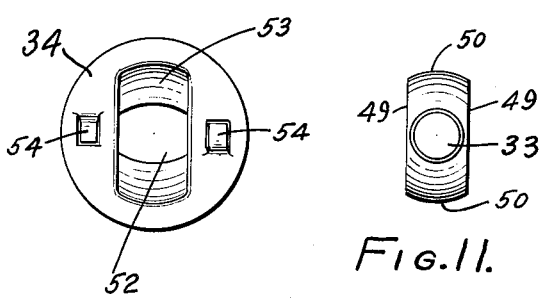
FIG. 11.
INVENTOR.
THEODORE H. HINCHCLIFFE
BY W Glenn Jones
ATTORNEY

3,085,676
CONVEYOR BELT CLEATS

Theodore H. Hinchcliffe, Pasadena, Calif.; Emily Hinchcliffe, administratrix of Theodore H. Hinchcliffe, deceased
Filed Mar. 18, 1960, Ser. No. 16,091
1 Claim. (Cl. 198—198)

This invention relates to improvements in belt conveyors and particularly to improvements in certain types of cam cleats or lugs that may be carried by such conveyor belts.

In certain types of conveyor belt operations, it may be desired to transport canned goods from one location to another and, at the same time, to perform a heat transfer operation upon the cans and their contents while they are in transit.

When perishable materials are canned, fermentation-promoting growths and organisms must be destroyed or their action inhibited by a suitable heat treatment. This heating is usually accomplished after the goods have been sealed in the can in order to prevent further possible atmospheric contamination. In order to prevent the congestion of cans emerging from the heat treatment means, it is customary in the packing art to positively cool the hot cans, ordinarily with cold water, instead of allowing them to cool by standing.

In one type of apparatus designed to accomplish this rapid cooling, the hot filled cans, disposed on their sides with their longitudinal axes transverse their direction of movement, are passed upwardly at a slight angle against a downwardly flowing stream of cooling liquid of controlled depth. During their upward passage, the cans are caused to oscillate or tip up and down in a vertical plane about an horizontal axis normal to their longitudinal axes and to revolve about their longitudinal axes in a direction opposite to their direction of upward travel. This type of apparatus comprises a conveyor belt moving upwardly in a trough adapted to confine a stream of cooling liquid flowing downwardly therein. The conveyor belt is provided with a plurality of cam cleats or lugs shaped, spaced and arrange to produce the desired motion of the cans when the belt is moved at a rate exceeding the rate of travel of the cans.

As will be more fully explained, hereinafter, the cam-shaped lugs or cleats, usually molded or formed from rubber, rubber substitutes, neoprene, certain plastics or other similar resilient materials, are typically arranged and spaced along the longitudinal edges or marginal surfaces of the outer surface of the conveyor belt. Heretofore, such lugs have been formed integrally with the surface of such conveyor belts, as in expensive molded belts; have been vulcanized or otherwise cemented into sockets formed or cut into the surface of the belt; have been cemented to the surface of the belt or have been fixed thereto by other generally unsatisfactory means. Obviously, such lugs or cam cleats are subject to rapid wear and attrition which, in the case of the molded belt, results in the early and expensive replacement of the entire belt. Where an attempt is made to remove and replace the lugs in the manners previously mentioned, such removal and replacement are time consuming, laborious, and generally result in unsatisfactory performance. Where the lugs as heretofore used are vulcanized, cemented, or otherwise secured to or into the surface of the belt, such lugs, due to their shape, have been stiff and unwieldy and have caused considerable wear on the under-surface of the belt as it passes over the pulleys at its ends.

The principal object of my invention, therefore, is to provide a cam-shaped lug or cam cleat which may be easily secured to or removed from the external surface of a conveyor belt.

Another object of my invention is to provide a cam-shaped lug or cam cleat that, due to its ease of installation and removal, may be spaced along the surface of a conveyor belt as desired, thus facilitating a change of spacing required by different dimensions of the goods being conveyed.

A further object of my invention is to provide a cam-shaped lug or cleat that may be securely fastened to the outer surface of a conveyor belt without occasioning undue and unnecessary wear of the under surface of the belt when passing over the driving and driven pulleys.

A still further object of my invention is to provide a cam-shaped lug or cam cleat which may be comparatively inexpensively molded and manufactured in quantity and thus, due to its ease of installation and removal, may be replaced many times during the life of a single conveyor belt.

Another object of my invention is to provide a cam-shaped lug or cleat that may be sealed to the surface of the belt so that the fastening means may be protected from penetration of the cooling fluid.

A further object of my invention is to provide a lug or cleat having a belt surface engaging portion adapted to maintain the base of the lug in close proximity to the surface of the conveyor belt under all conditions of flexure of said belt.

Another object of my invention is to provide improved fastening means whereby said lug or cleat may be securely fastened and sealed to the outer surface of the conveyor belt.

Other objects and advantages of my invention will be understood and appreciated in the light of the following detailed specification and accompanying drawings wherein:

FIGURE 1 is a plan view showing my improved lugs installed on a conveyor belt;

FIG. 2 is a longitudinal elevation of the parts shown in FIG. 1;

FIG. 3 is a transverse elevation taken on the line 3—3 of FIG. 1;

FIG. 4 is a cross-sectional elevation of my invention taken on the line 4—4 of FIG. 1;

FIG. 5 is a bottom view of the base of my improved lug or cleat;

FIG. 6 is a transverse cross-sectional view taken on the line 6—6 of FIG. 4;

FIG. 7 is an exploded view in perspective of the detachable fastening elements as used in my invention;

FIG. 8 is a partial cross-sectional elevation of my invention showing certain details;

FIG. 9 is a partial elevation showing my invention fastened to a belt traversing a pulley; and FIGS. 10 and 11 are detail views of the fastener elements used with my improved lug.

With reference to the various figures, FIG. 1 illustrates my improved lug or cam cleat 20 secured to the outer longitudinal marginal surfaces 31 of conveyor belt 30. As will be noted, the lugs on one side of the belt are staggered or offset with relation to those on the other side. Thus, as shown in FIG. 2, the high or cam portion 21 of the lug on one side of the belt is opposite to the depressed or valley portion 22 between the adjacent lugs on the opposite side of the belt. With the cans being transported and cooled disposed transversely of the belt and the belt traveling somewhat faster than the cans and in the same direction as the slower translational movement of the cans, the ends of the cans are alternately contacted by the cam portions 21 of the oppositely located lugs whereby the can is caused to oscillate in a vertical plane. As the cans are thus oscillated in the vertical plane, they are also rotated about their longitudinal axes by contact of the ends of the can with the lug's upper angular surfaces 23 and 24. It should be understood here, that the cans of heated goods are fed into the lower end of the upwardly tilted trough on to the moving conveyor belt and are forced slowly along the upward direction against the forces of gravity and the downwardly flowing coolant by the pressure of the cans being forced into the trough. Thus, the cans are disposed closely side by side as they travel slowly upwardly and the motion imparted to them by the faster traveling belt with its lugs or cam cleats is limited to the vertical oscillation and longitudinal rotation previously described.

As will be seen in FIG. 3, the higher or cam shaped portion 21 of the lugs 20 slope inwardly toward the center of the conveyor belt. Obviously, this inward slope facilitates the centering of the cans on the belt and serves to prevent the ends of the cans from contacting the sides of the trough (not shown) through which the belt travels.

FIGS. 4, 5, and 6 illustrate generally the construction of my improved lug or cleat 20 and the preferred mode of fastening or securing it to the upper or outer surface of the conveyor belt 30. Threaded and flanged inserts 25 are molded into the lug. Concentric with the vertical centerline of each insert, a truncated conical depression or cavity 26 is formed in the base 27 of the lug or cleat 20. This depression 26 has a protruding circular sealing lip or belt gripping projection 28 which extends somewhat beyond the general plane or inner surface 29 of the base of the lug. Holes 32 are drilled, punched, or otherwise formed through the belt 30 and are dimensionally spaced along the edge or marginal portion of the belt to conform with the centerline spacing of the cleat inserts 25 as well as to space the adjacent cleats from each other with relation to the size of the can to be processed. Segmented headed bolts or screws 33 are inserted upwardly through the belt from the underside thereof and are screwed into the inserts 25. Dished washers 34 are usually placed on the bolt next to its head before the bolt is inserted into or through the belt. The function of these washers will be explained later.

As indicated in FIGS. 4 and 8, the main body of my improved lug is generally triangular in shape with a rounded apex or cam portion 21 and the sloping sides or angular surfaces 23 and 24 extending downwardly from the apex toward the outward edges of the rectangular base 27. As previously mentioned, the cam or upper portion 21 slopes inwardly toward the center of the belt. Due to this inward slope, the apical ridge 21 is generally defined as a partial conical surface with the least radius of curvature at the outward portion 35 and a greater radius of curvature at the inward portion 36. As will then be noted, angular surfaces 23 and 24, extending downwardly to the horizontal surface of the belt, form compound angles with relation to the base of the lug. In conjunction with the acute angles formed at the transverse intersections 37 and 38 of these compound angular surfaces 23 and 24 with the base of the lug, these angular surfaces provide a smooth transitional path for the cam to traverse from the belt level to the apex of the cam portion 21 and then back down to belt level. As the leading angular surface 23 passes under and engages the edge of the can supported thereon, the can is induced to rotate in the direction opposite to its transitional motion while that end of the can is being lifted or raised vertically.

The base 27 of the lug 20 is generally rectangular in shape. As illustrated in FIGS. 4, 5, 6, and 8, the base comprises a generally planar inner surface 29 surrounded by a depending stabilizing border or rim 39. While this stabilizing border or rim serves to form a partial seal when the lug is pulled down or compressed on to the supporting belt surface, its principal function is to stabilize the lug in the transverse direction and thus prevent its tipping or rocking under the forces exerted by the impinging cans. While the generally planar inner surface 29 may be disposed horizontally with relation to the surface of the belt, the preferred arrangement comprises three planar surfaces as shown in FIGS. 5 and 8. End surfaces 40 incline slightly upward from the transverse edges 37 and 38 to the transverse axes 41 and 42 of the inserts 25. The portion 43 of the inner surface 29 between the two axes 41 and 42 is horizontal. The longitudinal portions 44 of the rim 39 are generally parallel to the planar portions 40 and 43. This arrangement of the inner surfaces 40 and 43 and the parallel portions of the stabilizing border or rim results in a slight concavity in the longitudinal direction. As the bolts 33 are screwed inwardly into the inserts 25, the stabilizing border or rim is forced down on to the surface of the belt, thus enhancing its partial sealing and stabilizing action.

It will be further noted from FIG. 8 that the circular lip 28, defining the outer or contacting boundary of the conical depression 26, is disposed slightly above the lower surfaces of the stabilizing border. Thus, as the lug is forced downwardly on the belt by the bolts 33, the stabilizing border makes first contact with the belt surface, followed by the positive sealing contact of the lip 28. While, as previously indicated, the stabilizing border or rim furnishes a partial seal, the latter may be broken somewhat when the belt goes around the driving or driven pulleys. The seal of the lip 28 remains intact, however, and the coolant fluid is effectively prevented from penetrating into the insert cavity or into the holes 32 formed in the belt for the passage of bolts 33. Since the belts generally used for this type of conveyor equipment are rubber covered fabrics, or otherwise described as fabric reinforced rubber covered belts, this sealing-off of hole 32 not only provides maximum protection for the belt but prevents corrosion of the bolts 33. The firm connection between lug and belt thus afforded, also prevents the lug from slipping on the surface of the belt and wearing the belt surface as well as enlarging the holes in the belt.

Due to the comparatively massive construction of the lug in its central portion and if no means were provided to prevent it, the lug, when firmly compressed onto the surface of the belt, would tend to stiffen the belt between the holes 32 and thus prevent its proper flexure when passing over the driving or driven pulleys. A further undesirable effect would be a comparatively considerably lifting of the lug edges 37 and 38 from the curved surface of the belt as it passes over the pulley. In order to prevent these two effects from occurring, or at least minimizing them to the greatest degree possible, a transverse hole or bore 45 is formed in the lug and a vertical cut or plane of separation 46 is provided which extends from the bore 45 to the apical surface 21. Bore 45 is made generally parallel to the base 27 and is located on or near the transverse center line of the lug. While the exact location of this bore with relation to the base is not critical, it should be so situated that the lug material between it and the base shall be of a sufficient thickness to provide proper flexibility in the longitudinal direction. The cut or plane of separation 46 is made with a very minimum of material removal, as with a very sharp, thin, circular blade. This is essential as, when the belt and consequently the base of the lug are horizontal, the two sides 47 of the cut 46 will meet and abut, thus preventing any movement of the forward portion of the lug when the can impinges on the leading angular surface 23. The flexing action of the bore 45 and cut 46 are illustrated in FIG. 9. As the horizontally disposed lug 20 with its cut 46 closed, as at A, moves with its belt on to the pulley 48, as at B, the lug is allowed to flex by means of the bore 45 and the opening of cut 46 which, in turn, allows the belt itself to flex normally on the pulley. This normal flexure of the belt prevents its undue wear on the pulley which would otherwise occur if the lug was unable to properly flex or bend.

As has been previously mentioned, the means for fastening my improved cam-like lug to its belt comprise the molded threaded insert 25, the segmented headed bolt or screw 33 and the dished washer 34. The insert 25 may be flanged and knurled, as shown, in order that it may be securely embedded in the lug material and be prevented from turning as the screw 33 is forced into it. While usually formed from metal, these inserts may be made of other materials such as plastics or other suitable materials.

For the type of use contemplated, as described above, the further fastening means must be self-locking as far as is practicable and must be prevented from loosening under severe conditions of shock and vibration. These conditions are successively met by providing special headed screws or bolts and specially designed coacting washers.

Thus, screw 33 is similar to a socket-headed flat screw except that two segments have been removed from the circular end or head surface resulting in two straight sides 49 connected by two circular arcs 50 as shown in FIGS. 7 and 11. As shown, the segmented head of the screw 33 is provided with a socket 51 which may be the usual hexagonal Allen socket or may be of any other suitable configuration for the reception of a correspondingly shaped wrench (not shown).

Dished washer 34, as variously shown in FIGS. 4, 6, 7, 8, and 10, is provided for use between the segmented head of the screw 33 and the under surface of the belt. This washer is generally circular in shape and is provided with a generally elliptical central hole 52 with its minor diameter of a size corresponding to the diameter of screw 33. A dished portion 53 is formed by forging or stamping into the washer which dished portion is shaped to receive the segmented head of the screw 33. Approximately centrally between the straight sides of the dished portion and the outer circular periphery of the washer and on a diameter thereof, the washer is provided with two prongs 54 which extend upwardly away from the outer or exposed flat surface of the washer. These prongs may also be formed by stamping or punching at the same time the dished portion is formed. These prongs are so formed that when the washer is rotated clockwise with the screw 33, it may be turned fairly easily. When the screw and washer are screwed home into the insert 25 and the under surface of the belt, the raised or protruding ends of the prongs dig into the belt and resist any ordinary tendency of the screw to rotate counter-clockwise such as might be induced by shock or vibration. When it becomes necessary to remove the lug, however, an application of force by means of the furnished wrench will force the washer and screw to rotate counter-clockwise for their removal from the lug and belt.

When first used, these dished washers 34 were provided with a central circular hole of sufficient diameter to accept the segmented-head screw 33. It was soon discovered, however, that in the process of cutting away the unwanted segments from the screw's flat head, slight burrs would occur at the curved intersection of the straight side with the conical under surface of the screw head. The location of a possible burr is indicated at 55 in FIG. 4. With the circular holed washers, these burrs would prevent the proper seating of the segmented head into the corresponding dished portion of the washer. As the screws were turned into the inserts, the burrs would deform the dished portions of the washers and thus effectively prevent any self-locking of screw and washer. With the elliptical hole now provided extending from one straight sided part of the dished portion to the other, the burred portion passes through the washer and the segmented head of the screw fits firmly and snugly into the dished portion of the washer. Another advantage of the elliptical hole in the washer over the former circular hole is found where the hole through the belt is not exactly normal to the under surface thereof. With the circular hole, a strain was put on both screw and washer when forcing the screw home into the insert and the washer into the under surface of the belt. The elliptical hole, however, provides a sufficient degree of self-alignment to be realized which removes the strain from the screw and allows the washer to be properly seated into the belt.

While I have described my improved lug or cam cleat in conjunction with a certain specific type of conveyor system adapted to transport and cool cans of heated goods, it should be understood that my lugs or cleats could be used in other systems. As one example, for instance, my lugs could be mounted on the base of a metallic or wooden trough. The cans could then be forced over the cam-like lugs by applying pressure to the line of cans. Where, as in this case, the lugs would be mounted on a compartively hard and unyielding surface, continued turning of the fastening screw through the base of the trough or other hard material might compress the base of the cleat beyond its elastic limit. However, the insert 25 is so located with relation to the conical depression 26 and the base 27 of the lug 20, that the lower surfaces 56 of the inserts 25 would come into contact with the upper surface of the trough before such unwanted deformation of the lug could occur. By thus locating the insert in the lug, taking into consideration the type and elastomer of the lug material, I effect a controlled compression which results in the proper sealing and stabilizing of the lug regardless of its manner of use.

Furthermore, whereas the depression 26 has been described as conical, it might well be in the shape of a shallow truncated pyramid. In this event the rim or lip 28 would be of square or rectangular configuration instead of the circular form shown. The entire base 27 of the lug could be oval or elliptical in form instead of rectangular. In certain uses and locations, particularly where the lug might be fastened to a hard and unyielding surface, the elliptical form of base might possess distinct advantages for more perfect sealing and reduction of wear to the inclined surfaces.

While many other uses and modifications of my improved cam-like lug or cleat may suggest themselves to those skilled in the art, it is considered that such may well fall within the spirit of my invention and the scope of the appended claim wherein, I claim:

A quickly attachable-detachable cam-shaped lug adapted to be mounted longitudinally on the longitudinal marginal edge surfaces of a moving load-bearing conveyor-type belt, said lug comprising, in combination:

a body of resilient material adapted to be compressively secured to the substantially planar upper surface of said load-bearing belt, said body having—
a generally triangular longitudinal cross-section;
a trapezoidal transverse cross-section;
a substantially rectangular base portion;
an upper cam-shaped surface consisting of a centrally disposed transverse conical apical ridge and two planar surfaces extending downwardly from said apical ridge to the transverse edges of said rectangular base, said planar surfaces being in compound angular relationship with the planar belt surface;
a lower surface on said base portion consisting of a generally concave inner planar surface surrounded by a peripheral planar stabilizing rim extending downwardly from said inner surface to meet and grip said planar belt surface when said lug is compressively secured thereto and a pair of concave conical sealing means depending from said inner planar surface for sealing portions of said lower surface to said belt surface when said lug is compressively secured thereto;
a centrally disposed transverse bore formed in said body, said bore being in the vertical plane of said apical ridge and a plane of separation leading from said bore to said apical ridge, said plane of separation coinciding with said vertical plane; and self-locking fastening means for compressively securing the said lug to said upper belt surface, said fastening means consisting of a threaded insert molded in said body, a segmented socket headed screw adapted to be inserted upwardly through said belt to threadedly engage said insert, and a formed and dished locking washer for positioning between the segmented head of said screw and the under surface of said belt, said washer having means to restrict its rotation with respect to the said belt under surface and a dished portion adapted to lockingly receive the segmented head of said screw and prevent its rotation after the compressive forces between said lug and said upper belt surface have been established.

References Cited in the file of this patent

UNITED STATES PATENTS

| | | |
|---|---|---|
| 1,788,735 | Olson | Jan. 13, 1931 |
| 2,270,813 | Olson | Jan. 20, 1942 |
| 2,597,223 | Burgess | May 20, 1952 |
| 2,809,743 | Hinchcliffe | Oct. 15, 1957 |
| 2,864,488 | Taipale | Dec. 16, 1958 |
| 2,875,887 | Hinchcliffe | Mar. 3, 1959 |

FOREIGN PATENTS

| | | |
|---|---|---|
| 936,200 | Germany | Dec. 7, 1955 |
| 721,679 | Great Britain | Jan. 12, 1955 |